United States Patent
Berg et al.

(10) Patent No.: US 6,598,175 B1
(45) Date of Patent: Jul. 22, 2003

(54) OPERATING SYSTEM SHUTDOWN ABSENT A DISPLAY AND KEYBOARD FOR A PROCESSOR LOCATED ON A PRINTED CIRCUIT BOARD

(75) Inventors: Mark R. Berg, Broomfield, CO (US); Billy G. Fuller, Westminster, CO (US); David Martin Sueper, Brighton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/365,194

(22) Filed: Aug. 2, 1999

(51) Int. Cl.[7] .................................................. H02H 3/05
(52) U.S. Cl. ............................... 714/24; 714/22; 713/1
(58) Field of Search ....................... 714/24, 22; 713/36, 713/1, 502

(56) References Cited

U.S. PATENT DOCUMENTS

| | | | | |
|---|---|---|---|---|
| 5,594,893 A | * | 1/1997 | Byers et al. | 713/502 |
| 5,596,711 A | * | 1/1997 | Burckhartt et al. | 714/23 |
| 5,781,770 A | * | 7/1998 | Byers et al. | 713/502 |
| 6,304,981 B1 | * | 10/2001 | Spears et al. | 714/22 |

* cited by examiner

Primary Examiner—Jeffrey Gaffin
Assistant Examiner—Harold Kim
(74) Attorney, Agent, or Firm—Patton Boggs LLP

(57) ABSTRACT

The system for simplified operating system shutdown enables the execution of the required operating system shutdown sequence without requiring the use of a monitor, keyboard, and mouse. This is accomplished by equipping the printed circuit board with a simple switch and an indicator device to provide the user interface to execute the operating system shutdown process. The user operates the switch, which activates the system for simplified operating system shutdown to initiate the required operating system shutdown process. The system for simplified operating system shutdown activates the indicator device in a first mode to notify the user that the shutdown process is now executing. The system for simplified operating system shutdown generates a message, which message is transmitted to the processor. This message comprises a system call for a shutdown and restart. No indication is provided by the operating system to indicate the successful completion of the shut down process, but in the restart process, the operating system generates predetermined POST codes, which are detected by the system for simplified operating system shutdown and used to hold the processor in a reset state. The system for simplified operating system shutdown then activates the indicator device to a second mode to indicate to the user that the operating system is shutdown and the circuit board can be removed from the circuit pack carrier.

18 Claims, 2 Drawing Sheets

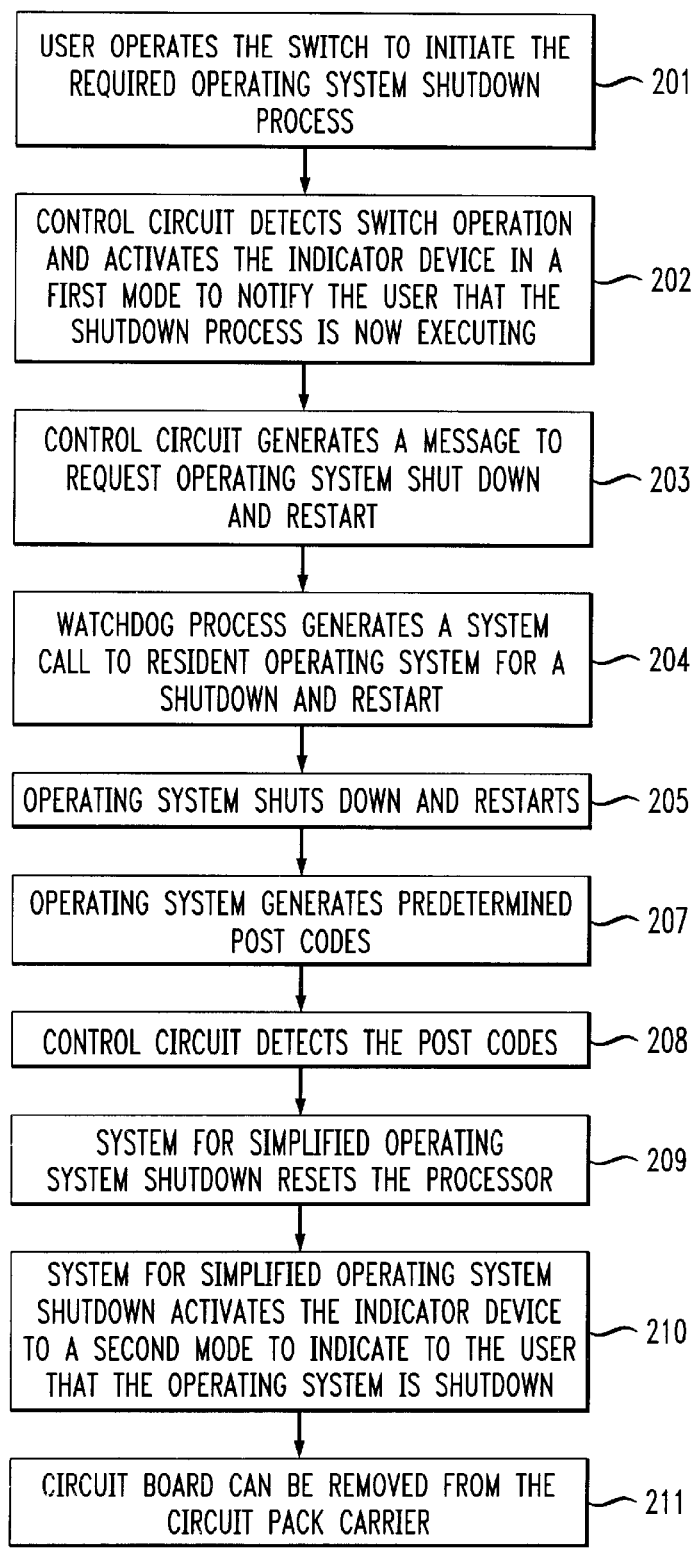

OPERATING SYSTEM SHUTDOWN ABSENT A DISPLAY AND KEYBOARD FOR A PROCESSOR LOCATED ON A PRINTED CIRCUIT BOARD

FIELD OF THE INVENTION

This invention relates to processors that are resident on a printed circuit board and, in particular, to a system that provides a simplified manner of shutting down the operating system, executing on the processor, when a monitor, keyboard, and mouse are not provided.

PROBLEM

It is a problem in the field of processors, resident on a printed circuit board, to properly terminate execution of any processes in an appropriate manner prior to powering down of the printed circuit board and the removal of the printed circuit board from its connector. This is particularly a problem when the printed circuit board includes a processor whose operating system must be shut down in a proper sequence to avoid the possibility of errors and there is no user interface with which to execute this sequence.

The Windows 95 and Windows NT operating systems, available from Microsoft Corporation, are frequently used in processors, such as personal computers, and require the user to follow a predetermined shut down sequence prior to powering off the personal computer. This sequence entails the user clicking on the "START" icon on the display screen (such as a VGA monitor) of the personal computer, then selecting the "SHUT DOWN" option that is displayed by the resident operating system in response to this selection. The user can then select either "SHUT DOWN THE COMPUTER" or "RESTART THE COMPUTER" as options to initiate the operating system shut down. The personal computer then provides a display on the screen indicating that the operating system is in the shut down process and the user must wait to power off the computer. Once the Windows 95 or Windows NT operating system has executed the shut down process, the personal computer provides a display indicating to the user that it is now safe to power off the personal computer.

This above-described process is predicated on the computer system being equipped with a display and a user activated input device, such as a mouse or keyboard, to make the proper selections noted above. No other indication is generated to indicate that the operating system is shutting down or has successfully completed the shut down process. In the instance where such apparatus is not available, such as when the processor is resident on a printed circuit board which is mounted in a printed circuit card carrier, then the shut down process cannot be executed in the above-described manner. The user would have to connect a VGA monitor and input device to appropriate connectors provided on the printed circuit board in order to properly shut down the operating system. This is a costly and labor intensive process and is therefore undesirable. In addition, the printed circuit board typically does not have the space available on the front of the circuit pack to enable the placement of such connectors or the power sources to run a VGA monitor. Therefore, there presently is no system available that enables the simplified shutting down an operating system, resident on a printed circuit board, when a monitor and keyboard are not provided.

SOLUTION

The above described problems are solved and a technical advance achieved by the present system for simplified operating system shutdown which enables the execution of the required operating system shutdown sequence without requiring the use of a monitor or a keyboard. This is accomplished by equipping the printed circuit board with a simple switch and an indicator device to provide the user interface to execute the operating system shutdown process. The user operates the switch, which activates the system for simplified operating system shutdown to initiate the required operating system shutdown process. The system for simplified operating system shutdown activates the indicator device in a first mode to notify the user that the shutdown process is now executing. The system for simplified operating system shutdown generates a message, which message is transmitted to the processor. This transmitted message comprises a system call for a shutdown and restart. This system call is an existing operating system call which represents the user clicking on the "START" icon on the display screen of the personal computer, then selecting the "SHUT DOWN" option that is displayed by the resident operating system in response to this selection and then selecting the "RESTART THE COMPUTER" option that is displayed. The operating system responds to this system call by shutting down and then restarting its operation.

No indication is provided by the operating system to indicate the successful completion of the shut down process, but in the restart process, the operating system generates predetermined POST codes, which are detected by the system for simplified operating system shutdown. In response to the detected POST codes, the system for simplified operating system shutdown resets the processor and holds it in a reset state by setting the reset lead in a reset state. The system for simplified operating system shutdown then activates the indicator device to a second mode to indicate to the user that the operating system is shutdown and the circuit board can be removed from the circuit pack carrier.

BRIEF DESCRIPTION OF THE DRAWING

FIG. 2 illustrates in flow diagram form the operation of the system for simplified operating system shutdown.

DETAILED DESCRIPTION

Figure 1:
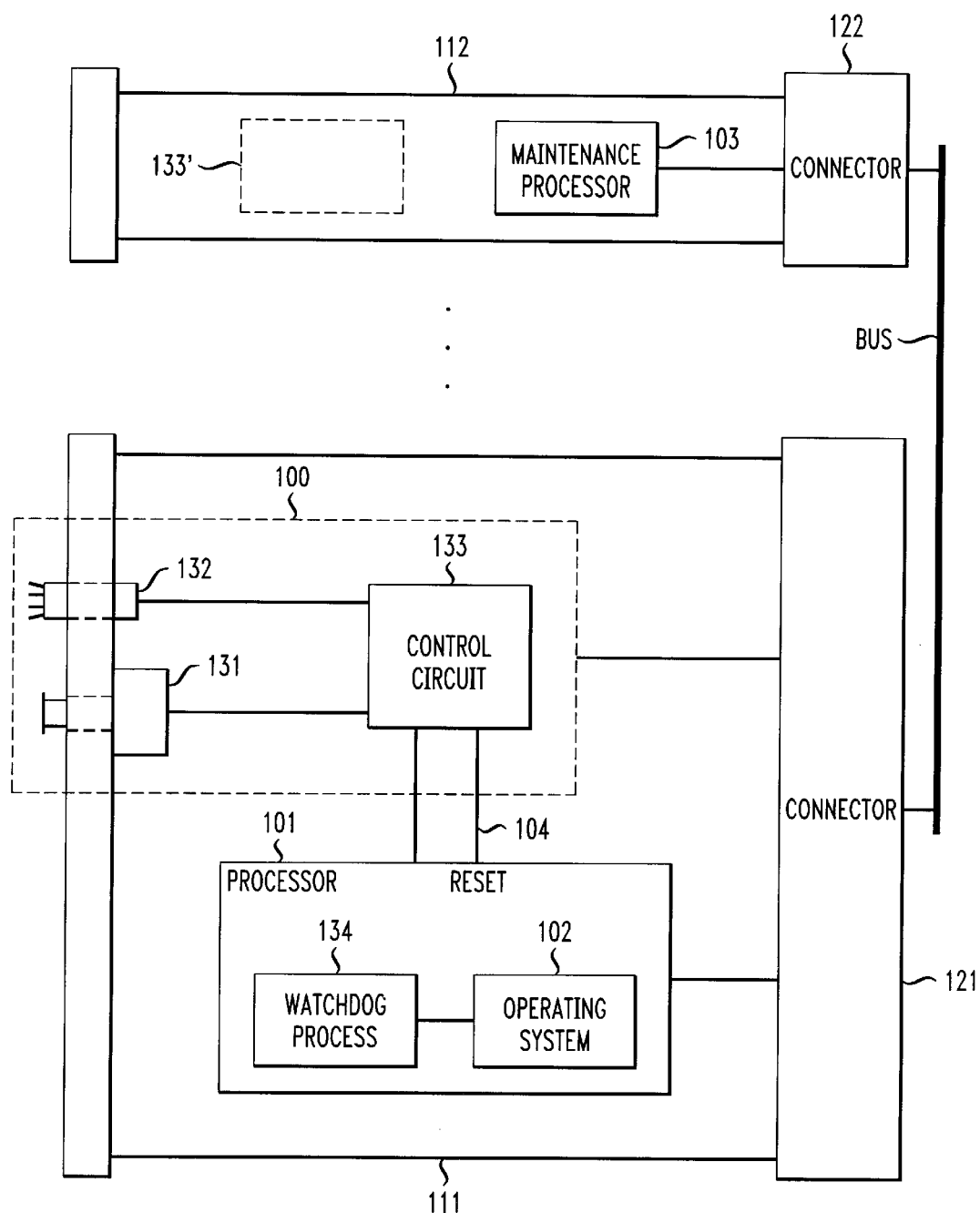
FIG. 1 illustrates in block diagram form the system for simplified operating system shutdown and an environment in which it is operational.

The Windows 95 and Windows NT operating systems, available from Microsoft Corporation, are frequently used in processors, such as personal computers, and require the user to follow a predetermined shut down sequence prior to powering off the personal computer. This sequence entails the user clicking on the "START" icon on the display screen (such as a VGA monitor) of the personal computer, then selecting the "SHUT DOWN" option that is displayed by the resident operating system in response to this selection. The user can then select either "SHUT DOWN THE COMPUTER" or "RESTART THE COMPUTER" as options to initiate the operating system shut down. The personal computer then provides a display on the screen indicating that the operating system is in the shut down process and the user must wait to power off the computer. Once the Windows 95 or Windows NT operating system has executed the shut down process, the personal computer provides a display indicating to the user that it is now safe to power off the personal computer. Absent the presence of a display device, no indication is provided by the operating system of the execution and completion of the shut down process.

Architecture of the System for Simplified Operating System Shutdown

FIG. 1 illustrates in block diagram form the system for simplified operating system shutdown and an environment in which it is operational. The operating environment typically comprises one or more circuit packs 111, 112 that are mounted in a circuit pack carrier, with the circuit packs being plugged into a corresponding connector 121, 122 that is mounted in the circuit pack carrier in well known fashion. A processor 101 is typically provided on one of the circuit packs 111, which processor 101 executes a resident operating system 102, such as Windows 95 or Windows NT, which requires the execution of a predefined sequence for proper operating system shut down.

The system for simplified operating system shutdown 100 enables the execution of the required operating system shutdown sequence without requiring the use of a monitor or a keyboard. This is accomplished by equipping the printed circuit board 111 with a simple switch 131 (such as a pushbutton switch) and an indicator device 132 (such as a light emitting diode) to provide the user interface to execute the operating system shutdown process. In addition, control circuitry 133 is provided to respond to the operation of the switch 131 and to control the operation of the illumination device 132. The control circuitry 133 can be a separate element or can be implemented as part of some existing portion of the system in which the processor 101 is operational. For example, a system typically includes a maintenance processor 103 which can be used for this purpose, or the system for simplified operating system shutdown 100 or just control circuit 133' could be mounted on circuit board 112 and in communication with processor 102 via the bus BUS. The system for simplified operating system shutdown 100 therefore comprises a minimum of apparatus and can be implemented in a distributed manner, using portions of existing system functionality or separate elements.

Operation of the System for Simplified Operating System Shutdown

FIG. 2 illustrates in flow diagram form the operation of the system for simplified operating system shutdown. At step 201, the user operates the switch 131, which activates the system for simplified operating system shutdown 100 to initiate the required operating system shutdown process. This is accomplished by the switch 131 converting the user's manual activation of switch 131 into an electrical signal which is transmitted to control circuit 133. The control circuit 133 of the system for simplified operating system shutdown 100 detects this electrical signal and at step 202 activates the indicator device 132 in a first mode to notify the user that the shutdown process is now executing. The indicator device can for example be placed in a flashing mode to indicate the execution of the shut down process, or can be illuminated in a predefined color mode, such as providing a red indication. The control circuit 133 of the system for simplified operating system shutdown 100 at step 203 generates a message, which is transmitted to the processor 101, which message requests operating system shut down and restart. The message can be a simple message to a watchdog process 134 that executes on processor 101 requesting the generation of a system call for a shutdown and restart or can comprise a system call for a shutdown and restart which is directly transmitted to the processor 101. Assuming that there is a watchdog process 134 extant on processor 101 that receives the request message, this watchdog process 134 at step 204 generates a system call to the resident operating system 102 for a shutdown and restart. This system call is an existing Windows operating system call which represents the user clicking on the "START" icon on the display screen of the personal computer, then selecting the "SHUT DOWN" option that is displayed by the resident operating system in response to this selection and then selecting the "RESTART THE COMPUTER" option that is displayed. The operating system 102 at step 205 responds to this system call by shutting down and then restarting its operation.

No indication is provided by the operating system 102 to indicate the successful completion of the shut down process, but in the restart process, the operating system 102 generates predetermined POST codes at step 207, which are detected by the control circuit 133 of the system for simplified operating system shutdown at step 208. In response to the detected POST codes, the system for simplified operating system shutdown resets the processor 101 and holds it in a reset state by setting the RESET lead 104 in a reset state at step 209. The system for simplified operating system shutdown 100 then activates the indicator device 132 at step 210 to a second mode to indicate to the user that the operating system 102 is shutdown and the circuit board can be removed from the circuit pack carrier at step 211. This indication can be illuminating the indicator device in a steady state or providing a green color indication where a multi-color LED is provided. Alternatively, an audible output indicator device can be used instead of a visual output indicator device.

SUMMARY

The system for simplified operating system shutdown enables the execution of the required operating system shutdown sequence without requiring the use of a monitor, keyboard or mouse. This is accomplished by equipping the printed circuit board with a simple switch and an indicator device to provide the user interface to execute the operating system shutdown process. A control circuit responds to the operation of the switch by generating a system call to the operating system to shut down and restart. The system for simplified operating system shutdown detects the restart of the operating system and forces the processor into a reset state to enable the removal of the circuit pack.

What is claimed:

1. A system for effecting shut down of an operating system that executes on a processor that is located on a printed circuit board, which processor is not connected to a display or keyboard, comprising:

means, responsive to a user manually operating a switch attached to said printed circuit board, for generating a shutdown trigger signal indicative of a request for operating system shutdown and restart;

means, responsive to receipt of said shutdown trigger signal, for generating a system call to said operating system to both shut down then restart operation of said processor; and means, responsive to said operating system effecting shut down and initiating restart, for interrupting the restart process and forcing said processor into a reset mode to prevent further operation of said processor.

2. The system for effecting the shut down of an operating system of claim 1 wherein said means for generating a shutdown trigger signal comprises:

switch means for translating a manual activation by said user into an electrical signal.

3. The system for effecting the shut down of an operating system of claim 1 wherein said means for generating a system call comprises:

means for detecting said shutdown trigger signal;
means for transmitting a message to said processor, requesting execution of a shut down and restart process.

4. The system for effecting the shut down of an operating system of claim 3 wherein said means for generating a system call further comprises:
means, resident in said processor and responsive to receipt of said message, for generating a predetermined system call to said operating system requesting execution of a shut down process and a restart process.

5. The system for effecting the shut down of an operating system of claim 1 wherein said means for forcing comprises:
means for monitoring said processor for the generation of predetermined POST codes; and
means, responsive to the generation of said predetermined POST codes, for activating a reset lead of said processor to force said processor into a reset state.

6. The system for effecting the shut down of an operating system of claim 1 further comprising:
means, responsive to receipt of said shutdown trigger signal, for generating a first human sensible indication to denote execution of an operating system shut down process.

7. The system for effecting the shut down of an operating system of claim 6 further comprising:
means, responsive to said operating system effecting a restart process, for generating a second human sensible indication to denote completion of an operating system shut down process.

8. A method for effecting shut down of an operating system that executes on a processor that is located on a printed circuit board, which processor is not connected to a display or keyboard, comprising the steps of:
generating, in response to a user manually operating a switch attached to said printed circuit board, a shutdown trigger signal indicative of a request for operating system shutdown and restart;
generating, in response to receipt of said shutdown trigger signal, a system call to said operating system to shut down then restart operation of said processor; and
interrupting, in response to said operating system effecting shut down and initiating restart, the restart process and forcing said processor into a reset mode to prevent further operation of said processor.

9. The method for effecting the shut down of an operating system of claim 8 wherein said step of generating a shutdown trigger signal comprises:
translating a manual activation of a switch by said user into an electrical signal.

10. The method for effecting the shut down of an operating system of claim 8 wherein said step of generating a system call comprises:
detecting said shutdown trigger signal;
transmitting a message to said processor, requesting execution of a shut down and restart process.

11. The method for effecting the shut down of an operating system of claim 10 wherein said step of generating a system call further comprises:
generating in said processor and in response to receipt of said message, a predetermined system call to said operating system requesting execution of a shut down process and a restart process.

12. The method for effecting the shut down of an operating system of claim 8 wherein said step of forcing comprises:
monitoring said processor for the generation of predetermined POST codes; and
activating, in response to the generation of said predetermined POST codes, a reset lead of said processor to force said processor into a reset state.

13. The method for effecting the shut down of an operating system of claim 8 further comprising the step of:
generating, in response to receipt of said shutdown trigger signal, a first human sensible indication to denote execution of an operating system shut down process.

14. The method for effecting the shut down of an operating system of claim 13 further comprising the step of:
generating, in response to said operating system effecting a restart process, a second human sensible indication to denote completion of an operating system shut down process.

15. A system for effecting shut down of an operating system that executes on a processor that is located on a printed circuit board, which processor is not connected to a display or keyboard, comprising:
switch activation means for generating, in response to a user manually operating a switch attached to said printed circuit board, a shutdown trigger signal indicative of a request for operating system shutdown and restart;
control circuit means, responsive to receipt of said shutdown trigger signal, for generating a system call to said operating system to shut down then restart; and
processor reset means, responsive to said operating system effecting shut down and initiating restart, for interrupting the restart process and forcing said processor into a reset mode to prevent further operation of said processor.

16. The system for effecting the shut down of an operating system of claim 15 wherein said control circuit means comprises:
message generating means, responsive to said switch activation means, for transmitting a message to said processor, requesting execution of a shut down process and a restart process; and
watchdog process means, resident in said processor and responsive to receipt of said message, for generating a predetermined system call to said operating system requesting execution of a shut down process and a restart process.

17. The system for effecting the shut down of an operating system of claim 15 wherein said processor reset means comprises:
POST code monitoring means for monitoring said processor for the generation of predetermined POST codes; and
reset signal generating means, responsive to the generation of said predetermined POST codes, for activating a reset lead of said processor to force said processor into a reset state.

18. The system for effecting the shut down of an operating system of claim 15 further comprising:
process indicating means, responsive to receipt of said shutdown trigger signal, for generating a first human sensible indication to denote execution of an operating system shut down process; and
process completion means, responsive to said operating system effecting a restart process, for generating a second human sensible indication to denote completion of an operating system shut down process.

* * * * *